(12) United States Patent
Froehlich et al.

(10) Patent No.: US 6,288,777 B1
(45) Date of Patent: Sep. 11, 2001

(54) SYSTEM AND METHOD FOR DETERMINING AT LEAST ONE PHYSICAL QUANTITY

(75) Inventors: Christoph Froehlich, Wangen; Markus Mettenleiter, Baienfurt, both of (DE)

(73) Assignee: Z+F Zoller & Fröhlich GmbH, Wangen im Allgäu (DE)

( * ) Notice: Subject to any disclaimer, the term of this patent is extended or adjusted under 35 U.S.C. 154(b) by 0 days.

(21) Appl. No.: 09/217,995

(22) Filed: Dec. 22, 1998

(30) Foreign Application Priority Data

Oct. 8, 1998 (DE) ............................................. 198 46 443
Nov. 6, 1998 (DE) ............................................. 198 51 307

(51) Int. Cl.[7] .......................... G01C 3/08; G01S 13/08
(52) U.S. Cl. ........................ 356/5.15; 342/127; 342/195; 356/5.09
(58) Field of Search .................. 356/5.09, 5.15; 342/127, 195

(56) References Cited

U.S. PATENT DOCUMENTS

| | | | |
|---|---|---|---|
| 4,639,129 | * | 1/1987 | Hullein et al. . |
| 4,861,159 | * | 8/1989 | Breen . |
| 5,162,862 | * | 11/1992 | Bartram et al. . |
| 5,694,204 | * | 12/1997 | Nakase et al. ........................ 356/5.15 |
| 5,940,170 | * | 8/1999 | Berg et al. ............................ 356/5.1 |

* cited by examiner

Primary Examiner—Stephen C. Buczinski
(74) Attorney, Agent, or Firm—Oblon, Spivak, McClelland, Maier & Neustadt, P.C.

(57) ABSTRACT

A system and method for determining at least one physical quantity by means of a relation between a transmission signal and a reception signal, wherein a transmitter emits the transmission signal having a predetermined frequency through a signal path for reception as the reception signal by a receiver. A reference signal generator generates a reference signal having a frequency which has a predetermined fixed relation to the frequency of the transmission signal. The reception signal is mixed with the reference signal to produce an intermediate frequency signal, which is filtered to isolate a difference signal, converted to a digital signal and then processed digitally to determine a phase and/or amplitude relation of the respective physical quantity to be determined. The transmission signal, the reference signal and the digital signal are generated in phase-locked relation using a clock signal derived from a main clock pulse of a master oscillator.

39 Claims, 3 Drawing Sheets

SYSTEM AND METHOD FOR DETERMINING AT LEAST ONE PHYSICAL QUANTITY

BACKGROUND OF THE INVENTION

1. Field of the Invention

The present invention relates to a system and a method for determining at least one physical quantity, usable preferably in active generation of corresponding depth and reflectivity images by means of a laser, and utilization thereof for environment detection.

2. Discussion of Background

It is known to use an active AMCW, or amplitude modulation continuous-wave laser measurement system, for range finding and/or reflectivity measurement. In the case of such a measuring system there exists, for example, the possibility of creating a sinusoidal transmission signal having the form $TRM(t)=\sin(\omega_1 t)$ e.g. by means of a semiconductor laser diode and emitting it over a to be measured signal path of the geometrical length D.

Owing to the signal path, the reception signal having the form $REC(t)=B \sin(\omega_1 t-\phi)$ exhibits both an attenuation and a phase shift with respect to the original transmission signal $TRM(t)$. The reception signal may, for example, be received by means of an avalanche photodiode.

It is an essential aspect of such a system to determine the existing phase shift as well as the existing attenuation with high precision, i.e. a relative error of approximately 0.01%, and with a very high measurement rate, i.e. up to $1 \times 10^6$ measurements/second. Herein the reception signal may have high signal dynamics or attenuation of up to 80 dB (1:10,000).

The geometrical length D of the measuring sticks and of the signal path in the system may be calculated directly for example by means of the following equation (1).

$$D = \varphi \frac{c}{\omega 1}$$

wherein, c designates the propagation velocity of the transmission signal $TRM(t)$, $\omega_1$ designates the measurement frequency used, $\phi$ designates the phase shift of the reception signal $REC(t)$ with respect to the transmission signal $TRM(t)$, and D designates the geometrical length of the signal path.

The following is a description of a principle of measurement used in the above described system and method.

The original sinusoidal transmission signal $TRM(t)=\sin(\omega_1 t)$ is compared to the reception signal $REC(t)=B \sin(\omega_1 t-\phi)$ received at the end of the signal path, which is now attenuated and phase shifted relative to the transmission signal $TRM(t)$. In order to obtain the phase shift $\omega$ of interest, the following equation (2) is used, which is obtained by application of the general mathematical interrelation sine sin $\beta=1/2[\cos(\alpha-\beta)-\cos(\alpha+\beta)]$.

$$\sin(\omega_1 t) \cdot B \cdot \sin(\omega_1 t-\phi)=B/2[\cos(-\phi)-\cos(2\omega_1 t-\phi)] \quad (2)$$

As can be seen from the left-hand member of equation (2), the original transmission signal $TRM(t)$ is multiplied by the reception signal $REC(t)$ to be evaluated. Following this multiplication, the double-frequency signal component $(\cos(2\omega_1 t-\phi))$ resulting from the multiplication is filtered out. In this way the phase angle to be determined is indirectly available in the value $B/2 \cos(-\phi)$. This term, however, contains two unknown quantities (which are to be determined), i.e., B and $\phi$, so that the following equation (3) is required which is obtained by application of the general mathematical interrelation sine cos $\beta=1/2[\sin(\alpha-\beta)+\sin(\alpha+\beta)]$.

$$\cos(\omega_1 t) \cdot B \cdot \sin(\omega_1 t-\phi)=B/2[\sin(-\phi)+\sin(2\omega_1 t-\phi)] \quad (3)$$

Here, as well, the double-frequency signal component $(\sin(2\omega_1 t-\phi))$ resulting from the multiplication is filtered out, so that ultimately the two intermediate results $B/2 \cos(-\phi)$ and $B/2 \sin(-\phi)$ containing the two unknown quantities B and $\phi$ are obtained. By applying the following equations (4) and (5) it is now possible to calculate the two values B and $\phi$ it to be determined.

$$\phi^* = \arctan\left(\frac{B\sin(-\phi)}{B\cos(-\phi)}\right) \quad (4)$$

$$B^* = 2 \cdot \sqrt{\left(\frac{B}{2}\sin(-\phi)\right)^2 + \left(\frac{B}{2}\cos(-\phi)\right)^2} \quad (5)$$

Herein $B^*$ and $\phi^*$ designate the calculated values for differentiation from the physical measurement values B and $\phi$.

It is now possible to calculate the geometrical length D of the signal path by applying the value $\phi^*$ thus determined in accordance with equation (1), and to calculate the intensity, or reflectivity, of the reception signal $REC(t)$ by applying the attenuated amplitude thus determined of the reception signal $REC(t)$.

Although the above described principle of measurement is absolutely exact in mathematical terms, there nevertheless result the following problems in technical implementation.

The signals to be multiplied by each other are located within a range of several tens of MHZ. This multiplication is generally performed by means of analog mixers. Such analog mixers are, however, not absolutely linear and their parameters are moreover temperature-dependent. This brings about errors in multiplication which falsify the final result, i.e., induce errors of measurement.

Moreover the signal $\cos(\omega_1 t)$ in equation (3), which is necessary for calculation, is generated from the original transmission signal $TRM(t)=\sin(\omega_1 t)$. The analog phase shifter usually employed for this purpose is, however, not an ideal phase shifter and accordingly causes equally temperature-dependent amplitude and/or phase errors resulting in errors of measurement.

Finally, the calculations required for obtaining $B^*$ and $\phi^*$ are performed in large-scale integrated digital signal processors, which requires that prior to these calculations the two intermediate results $B/2 \cos(-\phi)$ and $B/2 \sin(-\phi)$ obtained must be filtered and subsequently converted from an analog signal into a corresponding digital signal by means of an analog-to-digital converter. Due to the fact that these two intermediate results are processed through different, non-ideal filters and analog-to-digital converters, in turn temperature-dependent errors of measurement are introduced.

SUMMARY OF THE INVENTION

In view of the above described problems in the prior art, it is an object of the present invention to furnish a system and method for determining at least one physical quantity from a transmission signal and a reception signal, whereby non-corrupted measurement results may be obtained, or whereby it is possible to eliminate or compensate for errors of measurements.

This object is attained according to the present invention by providing a novel system for determining at least one physical quantity by means of a relation between a transmission signal and a reception signal, including a transmitter which generates and emits a transmission signal having a predetermined frequency; a receiver which receives the transmission signal, which has passed through a signal path, as a reception signal; a reference signal generator which generates a reference signal having a frequency which has a predetermined fixed relation to the frequency of the transmission signal; a first mixer which mixes the reception signal with the reference signal and produces an intermediate frequency signal; and a processor coupled to the intermediate frequency signal and configured to determine the at least one physical quantity based at least in part on the intermediate frequency signal. The invention is, of course, not limited to single-frequency methods but also encompasses multifrequency systems.

Owing to the fact that the reference signal is directly and separately derived, or generated, from the transmission signal, it is not necessary to derive the reference signal from the transmission signal by mixing, whereby errors owing to this mixing process may be avoided, errors brought about by the fact that the apparatus is not ideal.

Preferably by this mixing there is generated an intermediate frequency signal having a frequency corresponding to the difference between the frequency of the reception signal (or transmission signal), and that of the reference signal, such that the intermediate frequency signal may be located in a far lower frequency range than the reception signal, which is particularly useful for avoiding errors in subsequent digital processing.

Moreover in accordance with the present invention there is provided a novel method for determining at least one physical quantity through a relation between a transmission signal and a reception signal, including the steps of generating and emitting a transmission signal having a predetermined frequency through a signal path; receiving the transmission signal, which has passed through the signal path, as a reception signal; generating a reference signal having a frequency which has a predetermined fixed relation to the frequency of the transmission signal; mixing the reception signal with the reference signal to produce an intermediate frequency signal; and determining the at least one physical quantity based at least in part on the intermediate frequency signal.

By the method of the invention the advantages already described above with respect to the system of the invention are also obtained.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
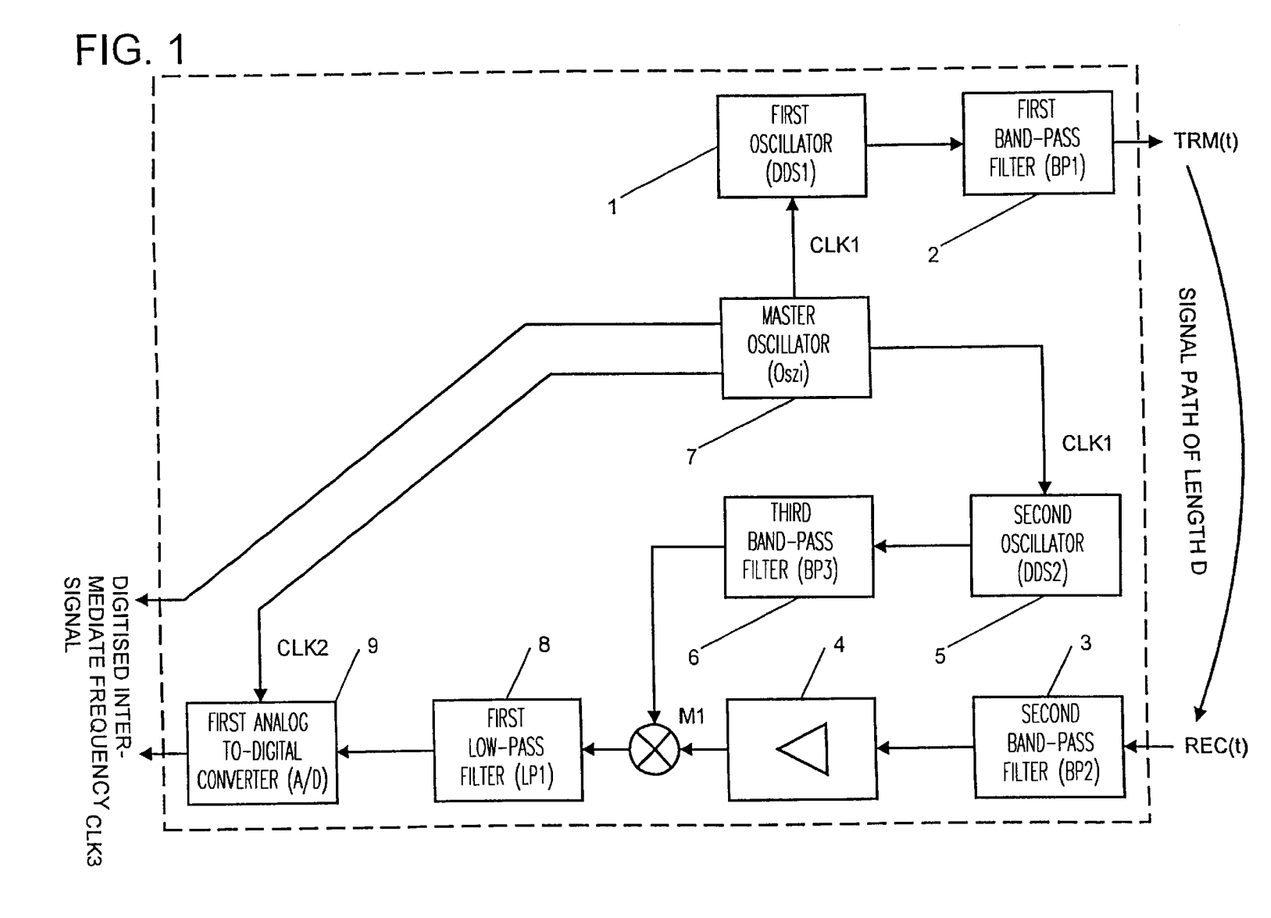
FIG. 1 is a schematic block diagram illustrating a transmitting/receiving unit of a system for determining at least one physical quantity in accordance with an embodiment of the present invention.

Referring now to the drawings, wherein like reference numerals identify the same or corresponding parts throughout the several views, and more particularly to FIG. 1 thereof, FIG. 1 shows a transmitting/receiving unit of a system for determining at least one physical quantity in accordance with the embodiment of the present invention.

In FIG. 1, reference numeral 1 designates a first oscillator (DDS1) for direct digital synthesis (DDS), reference numeral 2 designates a first band-pass filter (BP1), reference numeral 3 designates a second band-pass filter (BP2), reference numeral 4 designates an amplifier, reference numeral 5 designates a second oscillator (DDS2) for direct digital synthesis (DDS), reference numeral designates 6 designates a third band-pass filter (BP3), reference numeral 7 designates a master oscillator (Oszi), reference numeral 8 designates a first low-pass filter (LP1), reference numeral 9 designates an analog-to-digital converter (A/D), and reference symbol M1 designates a first mixer.

Moreover in FIG. 1 reference symbols CLK1, CLK2 and CLK3 designate first, second and third clock signals, TRM (t) designates a transmission signal, and REC(t) designates a reception signal.

The following is a description of the operation of the above described transmitting/receiving unit in accordance with the embodiment of the present invention.

A transmission signal having the form $TRM(t)=\sin(\omega_1 t)$ and a frequency $f_1$ ($\omega_1=2\pi f_1$) is generated by the first digital programmable oscillator 1. This first oscillator 1 operates along the principle of direct digital synthesis, or DDS. The first oscillator 1 receives the first clock signal CLK1 from the crystal stabilized master oscillator 7. In the represented embodiment digital frequency generators (DDS1, DDS2) are employed. As an alternative it would also be possible to utilize analog frequency generators.

The band-pass filter 2 eliminates undesired harmonic waves and synthesis products from the transmission signal TRM(t) thus generated, and the transmission signal TRM(t) is emitted. After passing through a signal path shown in FIG. 1, the phase-shifted sinusoidal signal REC(t) having the form $REC(t)=B \sin(\omega_1 t-\phi)$ is received, filtered by the second band-pass filter 3 and subsequently amplified by the amplifier 4. Herein the second band-pass filter 3 is adjusted to the frequency $f_1$ of the reception signal REC(t) for suppressing undesired interfering signals, and the amplifier 4 amplifies the reception signal REC(t), which may be strongly attenuated, to an amplitude A prior to further processing.

Moreover the second digital programmable oscillator 5 generates a sinusoidal signal having the form $2 \sin(\omega_2 t)$ and a frequency $f_2$ ($\omega_2=2\pi f_2$). This second oscillator 5, just like the first oscillator 1, operates along the principle of direct digital synthesis, or DDS. The second oscillator 1 also receives the first clock signal CLK1 from the crystal stabilized master oscillator 7.

Inasmuch as both the first oscillator 1 and the second oscillator 5 are driven by the same first clock signal CLK1, there is here a possibility to ensure that the frequency $f_2$ presents a highly accurate, constant frequency difference $f_3$ from frequency $f_1$, i.e., $f_3=f_1-f_2$. This is a very important point as will be seen more clearly from the following description. The signal generated hereby having the form $2 \sin(\omega_2 t)$ is supplied to the third band-pass filter 6 for eliminating undesired harmonic waves and synthesis products.

In the analog mixer M1 the reception signal REC(t) and the generated signal having the form $2 \sin(\omega_2 t)$ are mixed, which is equivalent to multiplication of these two signals when viewed mathematically. This multiplication can be seen from the following equation (6), which is obtained by applying the general mathematical interrelation sine sing= $1/2[\cos(\alpha-\beta)-\cos(\alpha+\beta)]$.

$$2A \cdot \sin(\omega_2 t) \cdot \sin(\omega_1 t - \phi) = A[\cos((\omega_1-\omega_2)t-\phi) - \cos((\omega_1+\omega_2)t-\phi)] \quad (6)$$

As can be seen from equation (6), the signal obtained by the multiplication contains two cosine-form signal components, with one signal component presenting the sum frequency $f_1+f_2$ and the other signal component presenting the differential frequency $f_1-f_2$.

By means of the first low-pass filter 8 present downstream from the first mixer M1, the cosine-form signal component together with the sum frequency is filtered out from the multiplication signal, whereby an intermediate frequency signal IF(t) in accordance with the following equation (7) is supplied to the input terminal of the analog-to-digital converter 9.

$$IF(t) = A \cdot \cos((\omega_1-\omega_2)t-\phi) \quad (7)$$

The above described process is referred to as mixing, wherein an intermediate frequency signal IF(t) is generated which contains the shift phase $\phi$ to be determined of the reception signal REC(t) in relation to the transmission signal TRM(t) as well as the amplitude A of interest. Consequently, if the above described frequency difference generated by the second oscillator 5 is very small, then an intermediate frequency signal IF(t) is generated, the frequency of which may be lower by several orders of magnitude than the frequency $f_1$ of the reception signal REC(t) as a result of the relation $f_3=f_1-f_2$.

For this reason, the intermediate frequency signal IF(t) can without any technical problems be detected and digitized at high resolution by the analog-to-digital converter 9, which is not possible with the reception signal REC(t) because of the high frequency $f_1$ of the reception signal REC(t) generally located in the range of several tens of MHZ.

The analog-to-digital converter 9 also receives a clock signal, clock signal CLK2, from the master oscillator 7.

Thus at an output terminal of the above described transmitting/receiving unit a digitized intermediate frequency signal is available which without error corresponds to the analog intermediate frequency signal IF(t), containing both the phase shift $\phi$ of the reception signal REC(t) relative to the transmission signal TRM(t) and also the amplitude A of interest.

This digitized intermediate frequency signal and also the third clock signal CLK3 from the master oscillator 7 are supplied to a digital signal processing unit which shall be described in the following. It should be noted in this context that the three clock signals CLK1, CLK2 and CLK3 are absolutely phase-locked with each other, in order not to corrupt the measurement.

Figure 2:
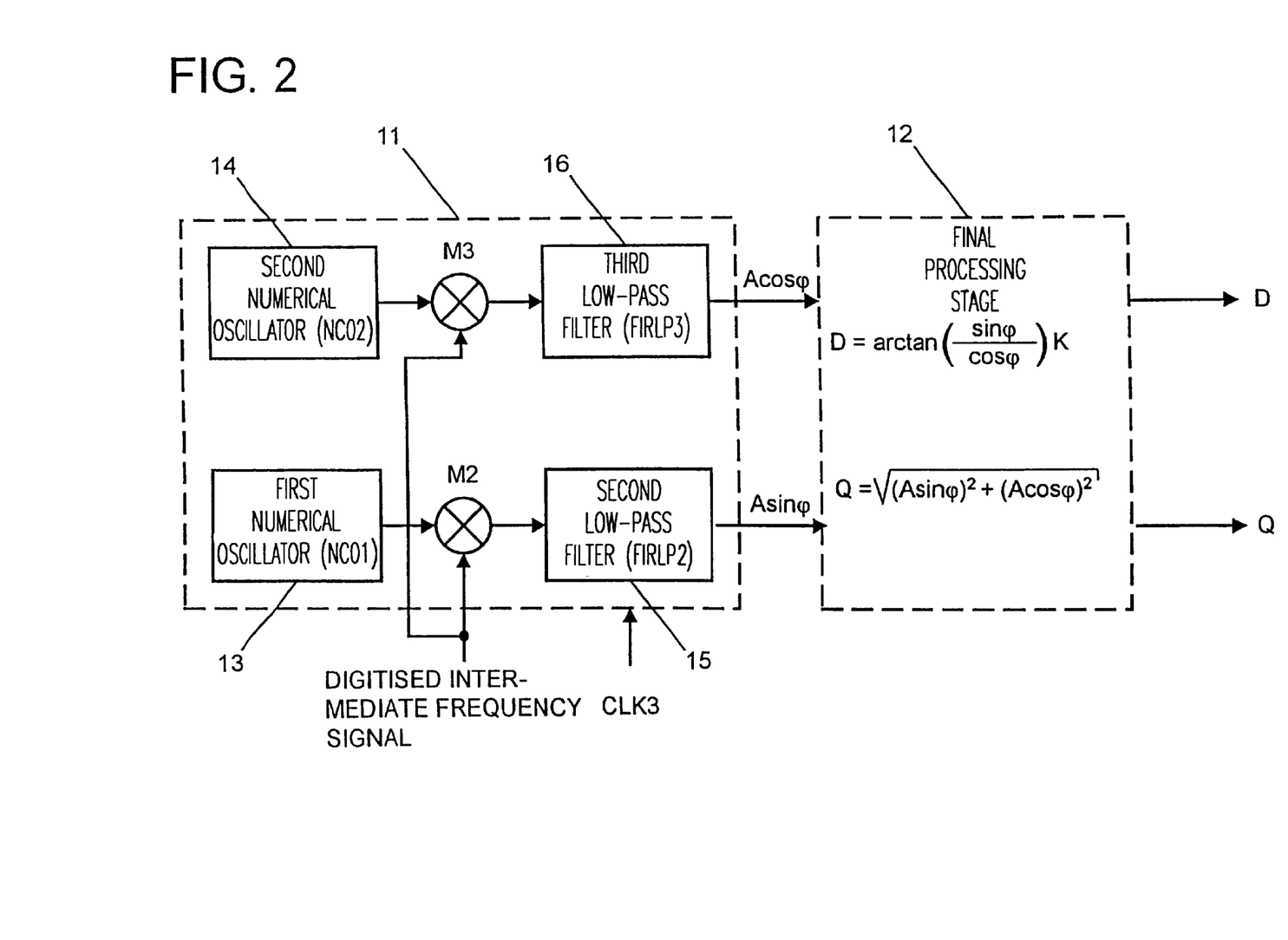
FIG. 2 a schematic block diagram illustrating a digital signal processing unit of the system for determining at least one physical quantity in accordance with the embodiment of the present invention.

FIG. 2 shows the digital signal processing unit of the system for determining at least one physical quantity in accordance with the embodiment of the present invention.

In FIG. 2, reference numeral 11 designates a large-scale integrated digital processor, reference numeral 12 designates a final processing stage, reference numeral 13 designates a first numerical oscillator (NCO1), reference numeral 14 designates a second numerical oscillator (NCO2), reference numeral 15 designates a second low-pass filter of the FIR, or Finite Impulse Response, type (FIRLP2), reference numeral 16 designates a third low-pass filter of the FIR, or Finite Impulse Response, type (FIRLP3), reference symbol M2 designates a second mixer, and reference symbol M3 designates a third mixer.

Moreover in FIG. 2 reference symbol CLK3 designates the third clock signal from the master oscillator 7 already mentioned by referring to FIG. 1, which is input to the digital processing unit as a reference clock signal, reference symbol D designates the ultimately calculated length of the signal path, and reference symbol Q designates the ultimately calculated intensity, or reflectivity, of the reception signal REC(t).

Hereinbelow the operation of the above described digital signal processing unit in to accordance with the embodiment of the present invention shall be described.

The digitized intermediate frequency signal generated by means of the transmitting/receiving unit 1 shown in FIG. 1 is input to the large-scale integrated digital processor of the digital signal processing unit shown in FIG. 2. To be more precise, this digitized intermediate frequency signal is supplied to both the second mixer M2 and a third mixer M3.

The digitized intermediate frequency signal supplied to the second mixer M2 is multiplied by the second mixer M2 by a signal having the form $\sin(\omega_3 t)$ and generated by the first numerical oscillator 13, which is also supplied to the second mixer M2. In a similar manner the digitized intermediate frequency signal supplied to the third mixer M3 is multiplied by a signal having the form $\cos(\omega 3t)$ generated by the second numerical oscillator 14, which is also supplied to the third mixer M3. It should be noted that in the signals generated by first and second numerical oscillators, the relations f3=f1−f2 and $\omega 3=\omega 1-\omega 2$ are fullfilled with utmost accuracy. This may, in turn, be ensured by the third clock signal CLK3 which, like the first and second clock signals CLK1 and CLK2, is generated by the master oscillator 7 in FIG. 1.

The result of these two above described multiplications is represented in the following equations (7) and (8) which are obtained by application of the general mathematical interrelations $\sin\alpha \cos\beta = 1/2[\sin(\alpha-\beta)+\sin(\alpha+\beta)]$ and $\cos\alpha \cos\beta = 1/2[\cos(\alpha-\beta)+\cos(\alpha+\beta)]$.

$$\sin(\omega_3 t) \cdot A \cdot \cos(\omega_1-\omega_2)t-\phi) = A/2[\sin(+\phi)+\sin(2\omega_3 t+\phi)] \quad (7)$$

$$\cos(\omega_3 t) \cdot A \cdot \cos(\omega_1-\omega_2)t-\phi) = A/2[\cos \sin(2\omega_3 t-\phi)+\cos(+\phi)] \quad (8)$$

By the identical digital second and third low-pass filter 15 and 16 of the FIR type arranged downstream of second and third mixers M2 and M3, the double-frequency signal components, i.e. $2\omega_3$, are filtered out from the signals defined by equations (7) and (8), wherein moreover an amplification by the factor 2 is performed which may, for example, be provided upstream from second and third low-pass filters 15 and 16 or also downstream from these.

As a result, at an output of the large-scale integrated digital processor 11 connected to the output terminal of the second low-pass filter 15, a signal having the form A sin $\phi$ is output to the subsequent final processing stage 12, and at another output of the large-scale integrated digital processor 11 connected to the output terminal of the third low-pass filter 16, a signal having the form A cos $\phi$ is output to the subsequent final processing stage 12. These two signals are passed on to the final processing stage 12 in the form of digital numerical values. Moreover it should be noted that the two digital filters 15 and 16 moreover permit just about any desired choice of band width of the signal in measurement operation.

Figure 3:
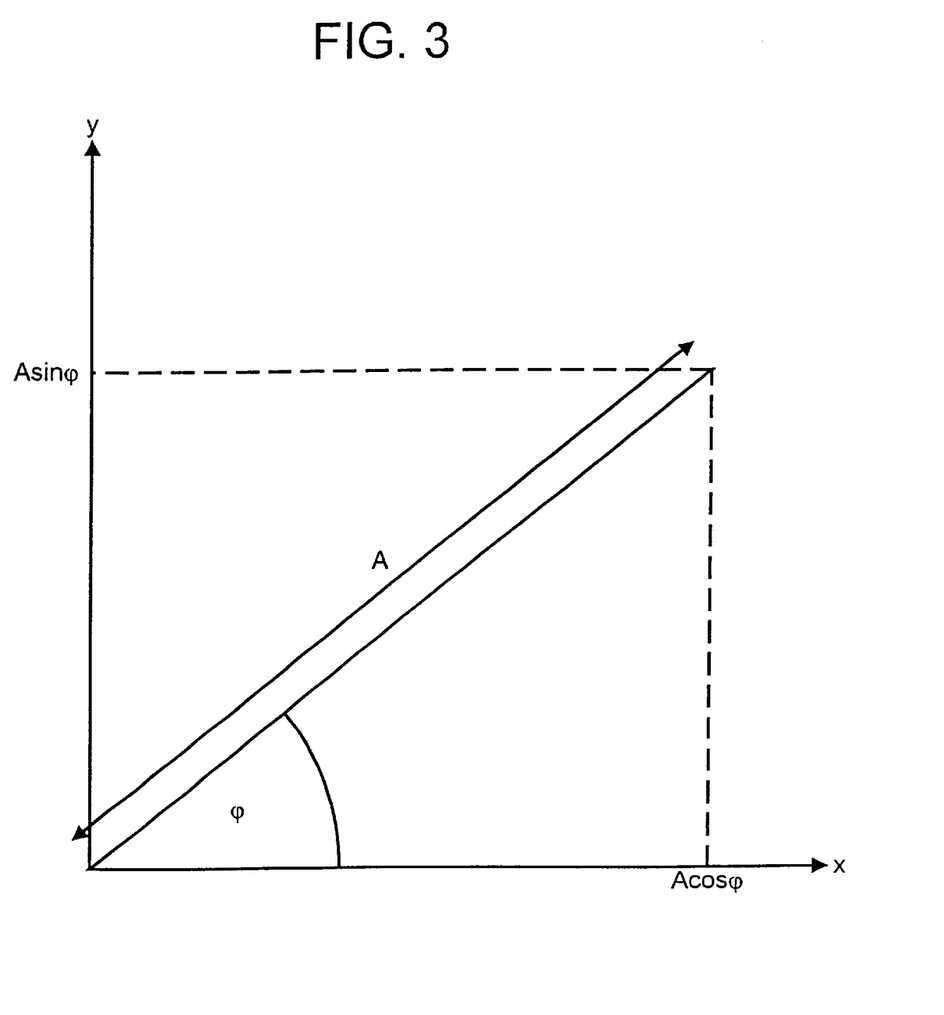
FIG. 3 is an illustration of a representation of a pointer comprised of two intermediate results in accordance with the embodiment of the present invention.

Reference is made to FIG. 3 which shows a representation of a vector comprised of the two intermediate results A sin $\phi$ and A cos $\phi$ in accordance with the embodiment of the present invention.

As can be seen from this figure, the two above mentioned intermediate results have such a relation to each other that, by taking into consideration equation (9) corresponding to equation (1) mentioned in the introductory portion of the present invention, the following equations (10) and (11) can be derived.

$$D = \phi \frac{c}{\omega 1} \phi \text{ in } RAD \quad (9)$$

$$D = \arctan\left(\frac{A\sin\phi}{A\cos\phi}\right) \cdot K \quad (10)$$

$$Q = \sqrt{(A\sin\phi)^2 + (A\cos\phi)^2} \quad (11)$$

Thus in equation (9), c designates the propagation velocity of the transmission signal TRM(t), $\omega_1$ designates the utilized measurement frequency, $\phi$ designates the phase shift of the reception signal REC(t) relative to the transmission signal TRM(t), and D designates the geometrical length of the signal path, or the depth value.

Moreover in equation (10), D also designates the geometrical length of the signal path, or the depth value, and K designates a constant derived from equation (9), which scales the result of measurement in meters, millimeters or any other desired unit of length.

Finally, in equation (11), Q designates the intensity, or reflectivity, of the reception signal REC(t).

When one now considers that the above described system is used with a laser measuring head which scans provided environment, for example by panning this laser measuring head, it is possible to obtain a depth image of the scanned environment by means of the depth values thus determined, and to obtain a reflectivity image of the scanned environment by means of the reflectivity values thus determined, with these two images being mutually corresponding images.

Final processing corresponding to equations (10) and (11) is accordingly performed in the final processing stage 12 in FIG. 2, with this final processing stage 12 generally being constituted by a special digital signal processor. From this final processing stage 12 the two obtained final results D and Q are then output to be available for further desired processing and/or analysis.

Moreover the following should be noted. The above described system and method rely on altogether four different oscillators 1, 5, 13 and 14, the single frequencies or which must have an absolutely constant and accurately defined phase relation among each other. This is ensured through the fact that all of the oscillators 1, 5, 13 and 14 possess digital clock generation, wherein they each use a common digital main clock pulse. This common digital main clock pulse is generated by the crystal stabilized master oscillator 7. The clock pulses CLK1, CLK2, or CLK3 represented in FIGS. 1 and 2 are accordingly derived from this digital main clock pulse in a phase-locked relation. To be more precise, for phase measurement two digital oscillators 13 and 14 and two oscillators 1 and 5 operating along the principle of direct digital synthesis, or DDS, are provided, whose clock is derived from the digital main clock pulse in accordance with the above description.

Moreover the two oscillators 1 and 5 working along the principle of direct digital synthesis differ in their output frequencies $f_1$ and $f_2$ by a minor amount $f_3$, i.e., $f_3 = f_1 - f_2$, which is used as an intermediate frequency. As a result, derivation of a reference signal from the transmission signal TRM(t), for example by mixing, is omitted. In the present case, the reference signal is instead generated directly by the separately provided second oscillator 5 operating along the principle of direct digital synthesis.

Through using merely the one analog-to-digital converter 9 and the subsequent multiplication and filter processing processes which are entirely digital and therefore identical for later processing taking place in parallel, errors in this processing sequence have precisely the same effect on the two pointers A sin $\phi$ and A cos $\phi$, with the result that such errors will accordingly be cancelled out again in the fraction of the arc tan function of equation (10) in the subsequent phase calculation in final processing stage 12.

Finally in the above described embodiment all of the oscillators 1, 5, 13, or 14 are started at a time $t_0$ following activation of the electronic system with a defined starting phase in order to ensure that all of the oscillators 1, 5, 13 and 14 always have a reproducible phase relation to each other.

Also, the above described system can, for example, be realized or integrated in a AMCW, or amplitude modulation continuous-wave laser measurement system as described in: "Aktive Erzeugung korrespondierender Tiefen—und Reflektivitätsbilder und ihre Nutzung zur Umgebungserfassung" [Active Generation of Corresponding Depth and Reflectivity Images and Their Use in Environment Detection], Wissenschafliche Schriften, Robotik, Pro Universitate Verlag, 1. Auflage, 1996, which is incorporated by reference herein.

In the system of the above cross-referenced literature not a single transmission signal and accordingly not a single reception signal is used, but two transmission signals having different frequencies and accordingly two reception signals of different frequencies are used. The two frequencies are, for example, 10 and 80 MHZ. The lower frequency is used to perform a so-called rough measurement with the purpose of obtaining a rough but absolute depth value, whereas the higher frequency is used for obtaining precise but ambiguous depth values.

With respect to detailed explanations, further manners of functioning, and a structure of the above named system, reference is made to the cross-referenced literature.

Also, it is noted that the present invention may preferably be utilized in active sensor systems, such as, for example microwave, ultrasonic and in particular laser sensors, which actively irradiate their surroundings. In these sensor systems it is possible e.g. to generate reflectivity values with the aid of the amplitude of the beam reflected on an object. Far-reaching independence from external disturbing influences on the measurement results is achieved by emission of high-intensity signals in a favorable spectral range with concurrent use of special signal filters. Two-dimensional and/or three-dimensional surveying of surroundings is achieved by deflection of the transmission signal into the directions in space to be surveyed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system for determining at least one physical quantity based on a relation between a transmission signal and a reception signal, comprising:
   a transmitter configured to generate and emit a transmission signal having a predetermined frequency based on a first clock signal output by a master oscillator;
   a receiver configured to receive the reception signal, the reception signal being the transmission signal at said predetermined frequency after said transmission signal has passed through a signal path, said reception signal containing information corresponding to said at least one physical quantity;

a reference signal generator configured to generate a reference signal having a frequency which has a predetermined non-zero fixed relation to the frequency of the transmission signal;

a first mixer configured to mix the reception signal with the reference signal to produce a single intermediate frequency signal having an intermediate frequency and containing said information corresponding to said at least one physical quantity; and a processor configured to receive the single intermediate frequency signal and a second clock signal output by the master oscillator and to determine the at least one physical quantity directly from said single intermediate frequency signal and the second clock signal.

2. A system according to claim 1, wherein the transmitter and the reference signal generator are coupled such as to be locked in phase.

3. A system according to claim 1, wherein the frequency of the reception signal has such a relation to the frequency of the reference signal that the intermediate frequency signal has a frequency which is lower than the frequency of the reception signal by at least one order of magnitude.

4. A system according to claim 2, wherein the frequency of the reception signal has such a relation to the frequency of the reference signal that the intermediate frequency signal has a frequency which is lower than the frequency of the reception signal by at least one order of magnitude.

5. A system according to any one of claims 1, 2, 3 or 4, comprising:

an analog-to-digital converter coupled to the intermediate frequency signal and configured to produce a digital signal corresponding to the intermediate frequency signal; and the processor comprising a digital processing unit which evaluates said digital signal.

6. A system according to claim 5, wherein the transmitter, the reference signal generator and the analog-to-digital converter are coupled such as to be locked in phase.

7. A system according to claim 6, wherein:

the transmitter comprises a first oscillator which generates the transmission signal of a first frequency ($f_1$), the reference signal generator comprises a second oscillator which generates the reference signal of a second frequency ($f_2$), wherein the first frequency ($f_1$) and the second frequency ($f_2$) have a predetermined frequency difference from each other which corresponds to a third frequency ($f_3$), the first mixer mixes the reception signal having a phase shift and a variation of amplitude relative to the transmission signal with the reference signal such that the intermediate frequency signal of the third frequency ($f_3$) which contains the phase shift and variation of amplitude is generated, the analog-to-digital converter converts the intermediate frequency signal into the digital signal, and the digital signal processing unit determines a depth value and a reflectivity value by means of the phase shift and variation of amplitude contained in the digital signal.

8. A system according to claim 7, wherein a first clock signal derived from a main clock pulse of a master oscillator is supplied to the first and second oscillators, respectively.

9. A system according to claim 8, wherein the first and second oscillators comprise direct digital synthesis oscillators.

10. A system according to claim 7, wherein a second clock signal derived from the main clock pulse of the master oscillator is supplied to the analog-to-digital converter.

11. A system according to claim 7, wherein the digital signal processing unit comprises:

a first numerical oscillator producing an output signal having a frequency ($f_3$);

a second numerical oscillator producing an output signal having a frequency ($f_3$); and a phase difference from the output signal of the first numerical oscillator of 90 degrees;

a second mixer having as inputs the output of the first numerical oscillator and the digital signal producing a second mixer output signal; and a third mixer having as inputs the output of the second numerical oscillator and the digital signal producing a third mixer output signal, wherein the digital signal is mixed by the second mixer with the output signal of frequency ($f_3$) generated by the first numerical oscillator, and is mixed by the third mixer with the output signal of frequency ($f_3$) generated by the second numerical oscillator.

12. A system according to claim 11, wherein a further clock signal derived from the main clock pulse of the master oscillator is supplied to the first numerical oscillator and to the second numerical oscillator.

13. A system according to claim 12, wherein the oscillators receiving clock signals derived from the main clock pulse of the master oscillator are activated at a predetermined time with a defined starting phase.

14. A system according to claim 13, wherein the transmission signal is a signal having the form TRM(t)=sin($\omega_1$t), the reception signal is a signal having the form RBC(t)=B sin($\omega_1$t−$\phi$), the reference signal is a signal having the form 2 sin($\omega_2$t), and the intermediate frequency signal is a signal having the form IF(t)=A cos(($\omega$1−$\omega$2)t−$\phi$).

15. A system according to claim 14, comprising:

a first low-pass filter which receives the intermediate frequency signal and filters out a signal component having a frequency $\omega_1$+$\omega_2$ generated by the first mixer.

16. A system according to claim 15, wherein the output signal generated by the first numerical oscillator corresponds to a signal having the form sin($\omega_3$t), and the output signal generated by the second numerical oscillator corresponds to a signal having the form cos($\omega_3$t), wherein $\omega_3$=$\omega_1$−$\omega_2$.

17. A system according to claim 16, wherein the digital signal processing unit further comprises:

a second low-pass filter which receives the second mixer output signal and filters out a signal component corresponding to a signal component of frequency 2$\omega_3$ generated by the second mixer; and a third low-pass filter which receives the third mixer output signal and filters out a signal component corresponding to a signal component of frequency 2$\omega_3$ generated by the third mixer.

18. A system according to claim 17, wherein the second low-pass filter outputs a signal having the form A sin $\phi$, and the third low-pass filter outputs a signal having the form A cos $\phi$, wherein $\phi$ designates the phase shift of the reception signal relative to the transmission signal, and A designates an amplitude of interest.

19. A system according to claim 18, wherein the depth value D is determined by means of the equation $$D = \arctan\left(\frac{A\sin\phi}{A\cos\phi}\right) \cdot K$$

in the digital signal processing unit, with K designating a constant which is derived by means of the equation $$D = \phi \frac{c}{\omega_1} \phi \text{ in } RAD$$

and scales the depth value D in a predetermined unit of length.

20. A system according to claim 19, wherein the reflectivity value Q is determined by means of the equation $$Q = \sqrt{(A \sin \phi)^2 + (A \cos \phi)^2}$$

in the digital signal processing unit.

21. A method for determining at least one physical quantity based on a relation between a transmission signal and a reception signal, comprising:
    generating and emitting a transmission signal having a predetermined frequency based on a first clock signal generated by a master oscillator through a signal path;
    receiving the reception signal, the reception signal being the transmission signal at said predetermined frequency which has passed through the signal path, said signal path imparting information about said at least one physical quantity on said reception signal;
    generating a reference signal having a frequency which has a predetermined non-zero fixed relation to the frequency of the transmission signal;
    mixing the reception signal with the reference signal to produce a single intermediate frequency signal having an intermediate frequency and containing said information corresponding to said at least one physical quantity; and
    determining the at least one physical quantity directly from said single intermediate frequency signal and a second clock signal generated by the master oscillator.

22. A method according to claim 21, comprising:
    generating the transmission signal and the reference signal in phase-locked relation.

23. A method according to claim 21, wherein the mixing step comprises:
    selecting a reference signal having a reference frequency such that when mixed with the reception signal produces said intermediate frequency signal having a frequency lower by at least one order of magnitude than the frequency of the reception signal.

24. A method according to claim 21, wherein the mixing step comprises:
    selecting a reference signal having a reference frequency such that when mixed with the reception signal produces said intermediate frequency signal having a frequency lower by at least one order of magnitude than the frequency of the reception signal.

25. A method according to any one of claims 21, 22, 23 or 24, comprising:
    generating a digital signal corresponding to the intermediate frequency signal and processing said digital signal digitally to determine the at least one physical quantity.

26. A method according to claim 25, comprising:
    generating the transmission signal, the reference signal and the digital signal in phase-locked relation.

27. A method according to claim 26, wherein
    the transmission signal is generated to have a first frequency ($f_1$),
    the reference signal is generated to have a second frequency ($f_2$), with ($f_1$)−($f_2$)=($f_3$),
    the reception signal, which presents a phase shift and a variation of amplitude relative to the transmission signal, is mixed with the reference signal such that the intermediate frequency signal has the frequency ($f_3$) and contains the phase shift and variation of amplitude,
    a digital signal corresponding to the intermediate frequency signal is generated, and
    a depth value and a reflectivity value are determined by means of the phase shift and variation of amplitude contained in the digital signal by means of digital signal processing.

28. A method according to claim 27, comprising:
    performing direct digital synthesis using a first clock signal derived from a main clock pulse to generate the transmission signal and the reference signal.

29. A method according to claim 28, comprising:
    using a second clock signal derived from the main clock pulse in generating said digital signal.

30. A method according to claim 29, comprising:
    generating first and second signals each being a third frequency ($f_3$);
    mixing the digital signal with the first signal of the third frequency ($f_3$); and
    mixing the digital signal with the second signal of the frequency ($f_3$).

31. A method according to claim 30, wherein said step of generating said first and second signals comprises:
    using a third clock signal derived from the main clock pulse.

32. A method according to claim 31, wherein generation of said transmission signal, said reference signal, and said first and second signals is started at a predetermined time with a defined starting phase.

33. A method according to claim 32, comprising:
    generating as the transmission signal a signal having the form TRM(t)=sin($\omega_1$t), as the reception signal a signal having the form REC(t)=B sin($\omega_1$t−$\phi$), as the reference signal a signal having the form 2 sin($\omega_2$t), and as the intermediate frequency signal a signal having the form IF(t)=A cos(($107_1$−$\omega_2$)t−$\phi$).

34. A method according to claim 33, comprising:
    filtering out a signal component having a frequency $\omega_1$+$\omega_2$ following mixing of the reception signal with the reference signal.

35. A method according to claim 34, wherein said first signal of the third frequency ($f_3$) has the form sin($\omega_3$t), and the second signal of the third frequency ($f_3$) has the form cos($\omega_3$t), wherein $\omega_3$=$\omega_1$−$\omega_2$.

36. A method according to claim 35, comprising:
    filtering out from the second and third mixer output signals resulting from mixing the first and second signals with the digital signal, a signal component corresponding to a frequency of 2$\omega_3$.

37. A method according to claim 36, wherein following filtering out of the signal component of the frequency 2$\omega_3$, a signal corresponding to a signal having the form A sin $\phi$ and a signal corresponding to a signal having the form A cos $\phi$ are output, wherein $\phi$ designates a phase shift of the reception signal relative to the transmission signal, and A designates an amplitude of interest.

38. A method according to claim 37, wherein a depth value D is determined by means of the equation $$D = \arctan\left(\frac{A\sin\phi}{A\cos\phi}\right) \cdot K$$

wherein K designates a constant which is derived by means of the equation $$D = \phi\frac{c}{\omega_1} \quad \phi \text{ in } RAD$$

and scales the depth value D in a predetermined unit of length.

39. A method according to claim 38, wherein a reflectivity value Q is determined by means of the equation $$Q = \sqrt{(A\sin\phi)^2 + (A\cos\phi)^2}.$$

* * * * *